Aug. 9, 1932.   W. CLAYTON   1,871,157
ANIMAL TRAP
Filed April 8, 1931
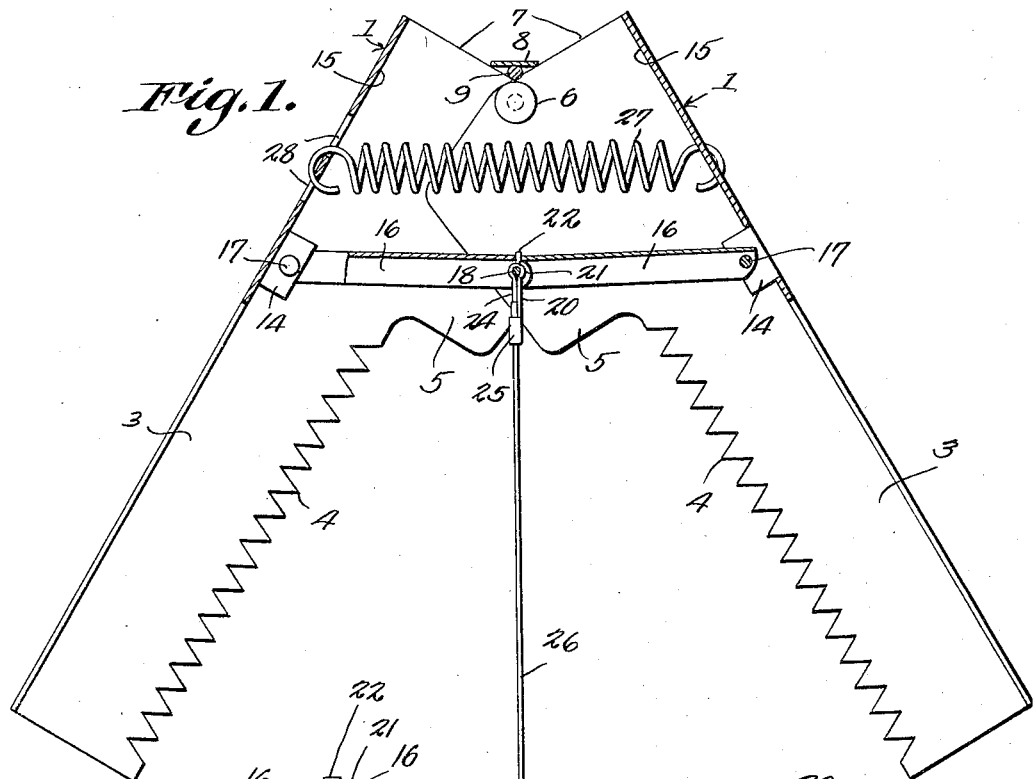
Fig.1.
Fig.3.
Fig.5.
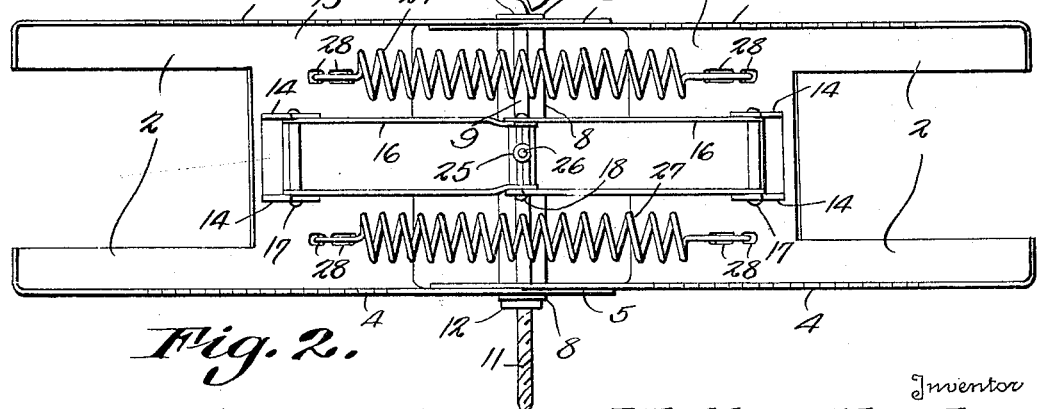
Fig.2.
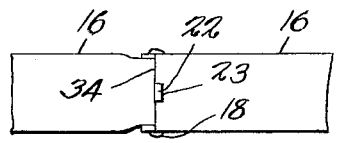
Fig.4.
Inventor
Walter Clayton
By C. A. Snow & Co.
Attorneys.

Patented Aug. 9, 1932

1,871,157

UNITED STATES PATENT OFFICE

WALTER CLAYTON, OF BELMAR, NEW JERSEY

ANIMAL TRAP

Application filed April 8, 1931. Serial No. 528,663.

This invention aims to provide a trap which will be extremely sensitive in action, a single trap having a wide range of utility, so far as taking animals of different sizes is concerned, the trap being adapted to hold the animal regardless of the direction in which the animal enters, the trap being useful either near or remote from a hole, on land or in water, and in practically any position. It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawing:

Figure 1 shows in longitudinal section, a trap constructed in accordance with the invention;

Figure 2 is a bottom plan of the trap;

Figure 3 is a sectional view taken through the toggle links;

Figure 4 is a top plan of the toggle links;

Figure 5 is a plan of the blank out of which a portion of the pendulum trigger is formed.

The trap forming the subject matter of this application preferably is made of metal throughout. It comprises jaws 1 which are trough-shaped in cross section. The jaws 1 have forks 2 at their lower ends, as shown in Figure 2. The side walls 3 of the jaws 1 are provided with teeth 4. The upper end of one jaw is located within the upper end of the other jaw, and the teeth 4 of the respective jaws will not strike together when the trap is sprung, this being amply disclosed in Figure 2 of the drawing.

At their upper ends, the jaws 1 have overlapped inward extensions 5, connected by pivot elements 6, which may be rivets. The upper edges 7 of the parts 5 of the jaws 1 form an angle.

The numeral 8 designates a yoke, which is U-shaped in elevation. The yoke 8 is straddled on the upper ends of the jaws, and the arms of the yoke 8 are pivotally mounted on the elements 6. The numeral 9 designates a shaft, mounted in the ends of the yoke 8, to turn therein, underneath the yoke 8. At one end, the shaft 9 has a turning head 10, and at its opposite end, the shaft 9 has a screw 11 which can be threaded into any object, to hold the trap in place. On the shaft 9, there is a collar 12. The upper ends of the jaws 1 are located between the turning head 10 and the collar 12. The shaft 9, therefore, cannot move endwise, although the shaft may be rotated by the head 10, to thread the screw 11 into any object.

Inwardly projecting ears 14 are struck from the outer walls 15 of the jaws 1. Trough shaped toggle links 16 are located between the jaws 1. The outer ends of the links 16 are mounted to swing on pivot elements 17 carried by the ears 14. The inner ends of the toggle links 16 are connected together by a pivot member 18, such as a short rod or rivet.

The numeral 19 designates, generally, a pendulum trigger, which is a composite structure. The pendulum 19 embodies a head, made out of a blank 29 (Figure 5) the blank comprising a body 30 and a cross piece 31 at one end of the body, the body and the cross piece being connected by a reduced neck 32, and there being a U-shaped slot 33 in the body 30. The body 30 is bent transversely to form a strip 20 (Figure 1) and to form an eye 21, the eye 21 being engaged about the pivot member 18 which connects together the inner ends of the toggle links 16. The eye 21 is extended to form a tongue 24, somewhat shorter than the strip 20, and extending downwardly in contact with the strip. The metal freed in the formation of the slot 33 of Figure 5, is turned upwardly to form a finger 22 extended between the abutting inner ends 34 of the toggle links 16, and received in a notch 23 formed in the inner end of one of the toggle links. The ends of the cross piece 31 of Figure 5 are turned inwardly toward each other, to form a socket 25, in which is received and secured the upper end of a foot 26, in the form of a rod, the upper end of the rod abutting against the lower end of the tongue 24, shown in Figure 1.

A resilient means is provided for moving the jaws 1 toward each other, when the trap is sprung, and with this end in view, pull springs 27 are located between the jaws 1, on opposite sides of the toggle links 16, as shown in Figure 2, the springs 27 having their outer ends engaged in holes 28 formed in the outer walls 15 of the jaws 1.

Generally considered, the trap hereinbefore described comprises a pair of jaws 1, a pivotal connection 6 between the jaws, spring means 27 for moving the jaws toward each other, toggle links 16 having their outer ends pivoted to the jaws, a pivot member 18 connecting the inner ends of the toggle links together, the toggle links being movable until they abut at their inner ends and form a slight obtuse angle, away from the pivotal connection 6 between the jaws, thereby keeping the jaws from closing together under the action of the spring means 27, and a pendulum trigger 19 located between the jaws. The pendulum trigger 19 is mounted to swing on the pivot member 18, the trigger being provided with a finger 22 engaging one of the toggle links 16, between the pivot member 18 and the pivotal connection 6, the finger and the link which it engages forming a fulcrum for the trigger 19, whereby, when the trigger 19 is swung by an animal, the pivot member 18 will be carried far enough toward the pivotal connection 6 to knuckle the links 16 toward the pivotal connection 6, and permit the jaws 1 to close, under the action of the spring means 27.

The amount that the jaws 1 will open, the angle assumed by the links 16, and consequently the sensitiveness of the trap, are regulated by the width of the yoke 8, and it is possible to make the yoke 8 of such width that, as shown in the drawing, the trap will have practically a hair-trigger action. The yoke 8, moreover, in combination with the screw shaft 9—10—11, forms a means whereby the trap will be held in any desired position, the screw 11 being threaded into any accessible object when the shaft is turned by means of the head 10.

The device forming the subject matter of this application is highly efficient, and a single trap may be used for catching animals as small as a mouse or as large as a fox. The trap will kill the animal almost instantly, and no bait is required. The trap will work in any position whatsoever, either on land or in water, on a tree, in a burrow, in a path, in the mud, or elsewhere. It may or may not be fastened down by means of the screw 11. The trap will trip from any angle, and has a hair-trigger action, if the operator desires, this feature, however, being regulated by the width of the yoke, as has been explained hereinbefore.

Having thus described the invention, what is claimed is:

1. A trap comprising a pair of jaws, a pivotal connection between the jaws, spring means for moving the jaws toward each other, toggle links having their outer end pivoted to the jaws, a pivot member connecting the inner ends of the toggle links together, the toggle links being movable until they abut at their inner ends with the links in substantially longitudinal alignment thereby keeping the jaws from moving under the action of the spring means, and a pendulum trigger located between the jaws and mounted to swing on the pivot member which connects the inner ends of the toggle links together, the trigger being provided with a finger engaging one of the toggle links, between said pivot member and said pivotal connection, the finger and the link which it engages forming a fulcrum for the trigger, whereby, when the trigger is swung, as a lever of the second order, the pivot member will be carried far enough toward said pivotal connection to knuckle the links toward said pivotal connection, and permit the jaws to close, under the action of the spring means.

2. A trap comprising a pair of jaws, a pivotal connection between the jaws, spring means for moving the jaws toward each other, toggle links having their outer ends pivoted to the jaws, a pivot member connecting the inner ends of the toggle links together, the toggle links being movable until they abut at their inner ends and form a slight obtuse angle, away from said pivotal connection, thereby keeping the jaws from moving under the action of the spring means, a pendulum trigger located between the jaws and mounted to swing on the pivot member, the trigger being provided with a finger engaging one of the toggle links, between said pivot member and said pivotal connection, the finger and the link which it engages forming a fulcrum for the trigger, whereby, when the trigger is swung, the pivot member will be carried far enough toward said pivotal connection to knuckle the links toward said pivotal connection, and permit the jaws to close, under the action of the spring means, and a yoke mounted on said pivotal connection between the jaws, the yoke engaging the ends of the jaws, to limit the opening movement of the jaws, to adjust the angle between the toggle links, and to regulate the sensitiveness of the toggle links responsive to the trigger.

3. A trap comprising a pair of jaws, a pivotal connection between the jaws, spring means for moving the jaws toward each other, toggle links having their outer ends pivoted to the jaws, a pivot member connecting the inner ends of the toggle links together, the toggle links being movable until they abut at their inner ends and form a slight obtuse angle, away from said pivotal connection, thereby keeping the jaws from moving under the action of the spring means, a pendulum trigger located between the jaws and mounted to swing on the pivot member, the trigger being provided with a finger engaging one of the toggle links, between said pivot member and said pivotal connection, the finger and the link which it engages forming a fulcrum for the trigger, whereby, when the trigger is swung, the pivot member will be carried far enough toward said pivotal connection to knuckle the links toward said pivotal connection, and permit the jaws to close, under the action of the spring means, a yoke mounted on the pivotal connection between the jaws, the yoke engaging the ends of the jaws to limit the opening movement of the jaws, to regulate the angle between the toggle links, and to regulate the sensitiveness of the toggle links responsive to the trigger, a shaft journaled in the yoke and provided at one end with a turning head, and a screw on the opposite end of the shaft and adapted to engage an object, to anchor the trap.

4. A trap comprising a pair of jaws, a pivotal connection between the jaws, spring means for moving the jaws toward each other, toggle links having their outer ends pivoted to the jaws, a pivot member connecting the inner ends of the toggle links together, the toggle links being movable until they abut at their inner ends and form a slight obtuse angle, away from said pivotal connection, thereby keeping the jaws from moving under the action of the spring means, a pendulum trigger located between the jaws and mounted to swing on the pivot member, the trigger being provided with a finger engaging one of the toggle links, between said pivot member and said pivotal connection, the finger and the link which it engages forming a fulcrum for the trigger, whereby, when the trigger is swung, the pivot member will be carried far enough toward said pivotal connection to knuckle the links toward said pivotal connection, and permit the jaws to close, under the action of the spring means, the pendulum trigger embodying an eye engaged around said pivot member which unites the inner ends of the toggle links, the eye having side portions of different lengths, the longer side portion being provided with a socket, and a foot held in the socket and abutting at its end against the end of the shorter side portion of the eye.

In testimony that I claim the foregoing as my own, I have hereto affixed my signature.

WALTER CLAYTON.